(12) United States Patent
Gu et al.

(10) Patent No.: US 7,271,691 B2
(45) Date of Patent: Sep. 18, 2007

(54) METHOD OF WINDING COIL AND TRANSFORMER AND INVERTER LIQUID CRYSTAL DISPLAY HAVING COIL WOUND USING THE SAME

(75) Inventors: Seung Man Gu, Suwon-si (KR); Jung-Taeck Yer, Gumi-si (KR); Hyung Geun Kim, Gumi-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/026,941

(22) Filed: Dec. 27, 2001

(65) Prior Publication Data
US 2002/0140538 A1  Oct. 3, 2002

(30) Foreign Application Priority Data
Mar. 31, 2001  (KR) ............... 10-2001-17099

(51) Int. Cl.
H01F 27/28 (2006.01)
H01F 27/24 (2006.01)
(52) U.S. Cl. ............... 336/182; 336/208; 336/212
(58) Field of Classification Search ............ 336/192, 336/198, 208, 210, 212, 160, 200, 180–182; 29/602.1
See application file for complete search history.

(56) References Cited

U.S. PATENT DOCUMENTS

| 3,668,586 | A | * | 6/1972 | Horbach | 336/210 |
| 4,352,081 | A | * | 9/1982 | Kijima | 336/198 |
| 4,394,636 | A | * | 7/1983 | Hiraku et al. | 336/172 |
| 4,454,492 | A | * | 6/1984 | Thackray | 336/69 |
| 4,887,061 | A | * | 12/1989 | Matsumura | 336/178 |
| 5,200,731 | A | * | 4/1993 | Tochio et al. | 336/98 |
| 5,736,917 | A | * | 4/1998 | Kawano et al. | 336/90 |
| 5,847,518 | A | * | 12/1998 | Ishiwaki | 315/276 |
| 6,326,874 | B1 | * | 12/2001 | Banzi et al. | 336/192 |
| 6,384,704 | B1 | * | 5/2002 | Motomura | 336/192 |
| 6,509,822 | B2 | * | 1/2003 | Junjie et al. | 336/198 |

FOREIGN PATENT DOCUMENTS

JP          10135042 A  *  5/1998

* cited by examiner

*Primary Examiner*—Anh Mai
(74) *Attorney, Agent, or Firm*—Morgan, Lewis & Bockius LLP

(57) ABSTRACT

A method of winding a coil of a transformer in an inverter of a liquid crystal display including a bobbin wound with a coil and a core introduced into the bobbin, the method includes forming a coil winding part having no protrusion member at the bobbin so as to exclude an interference caused by the protrusion member from a path wound with the coil; and continuously winding the coil from one side of the coil winding part to another side thereof.

7 Claims, 14 Drawing Sheets

METHOD OF WINDING COIL AND TRANSFORMER AND INVERTER LIQUID CRYSTAL DISPLAY HAVING COIL WOUND USING THE SAME

The present invention claims the benefit of Korean Patent Application No. P2001-17099, filed in Korea on Mar. 31, 2001, which is hereby incorporated by reference.

BACKGROUND OF THE INVENTION

1. Field of the Invention

This invention relates to a transformer for a lamp driving circuit of a liquid crystal display, and more particularly to a method of winding a coil of a transformer in an inverter of a liquid crystal display that is adapted to reduce a power loss.

2. Discussion of the Related Art

A liquid crystal display (LCD) of an active matrix driving system may use thin film transistors (TFTs) as switching devices to display a natural moving picture. Since LCDs can be formed into smaller devices than existing Brown tubes, they are used commonly in computer monitors and laptops, in office automation equipment such as copy machines, and in portable equipment such as cellular phones and pagers.

Such LCDs usually require light sources such as backlights since the LCDs do not emit light themselves. A typical backlight is driven with an inverter and consumes a great amount of power in the LCD devices. The inverter may be divided into a DC/DC converter and a DC/AC converter. The DC/DC converter generates a DC voltage using a pulse width modulation (PWM). The DC/AC converter functions to convert the voltage applied from the DC/DC converter into an AC voltage that is sufficiently high to turn on a lamp.

However, the conventional inverter for an LCD consumes a large amount of power, which deteriorates the performance of a transformer that is contained in the DC/AC converter.

Referring to FIG. 1 and FIG. 2, a transformer for the inverter of the LCD includes a bobbin 1 wounded with a coil 2 and having a barrier rib 1a formed at every constant distance, and ferrite cores 4a and 4b introduced into the center of the bobbin 1.

The bobbin 1 provided with the barrier rib 1a is molded with a plastic. The ferrite cores 4a and 4b are mixed with a fine powder, such as iron oxide or manganese, that is responsible for guiding a magnetic flux. Each of these ferrite cores 4a and 4b is molded into an 'E' shape, and the centers thereof pass through the bobbin 1. The side walls of the ferrite cores 4a and 4b surround the side wall of the bobbin 1 wound with the coil 2. The coil 2 has a primary side and a secondary side wound at a different winding frequencies in accordance with predetermined winding ratios, and a current flows in the coil 2.

Each end of the bobbin 1 is provided with a lead pin 3. The coil 2 is wound within concave winding parts 5a, 5b and 5c between the barrier ribs 1a as shown in FIG. 3. The coil winding parts of the bobbin 1 wound with the coil 2 are wound with a tape. After the ferrite cores 4a and 4b are assembled into the bobbin 1, the ferrite cores 4a and 4b are surrounded by an adhesive tape. The winding parts 5a, 5b and 5c wound with the coil 2 correspond to a low voltage area, a middle voltage area and a high voltage area, respectively, while having the side walls of both ends of the bobbin 1 and the barrier ribs 1a therebetween. The low voltage area, the middle voltage area and the high voltage area each have a successively higher number of windings.

In a transformer of the inverter for the LCD, the winding arrangement of the coil 2 is shown in FIG. 4. In FIG. 4, the first round begins to be wound at the left side of the bottom within the left winding part Sa and then the next rounds are wound in a zigzag shape. After the 25th round is wound, the middle winding part 5b at the center thereof begins to be wound. Subsequently, in the same manner as the left winding part 5a, the 26th round begins to be wound at the left side of the bottom within the middle winding part 5b and the next rounds are wound in a zigzag shape. Thereafter, the right winding part 5c begins to be wound and then the next rounds are wound in the same manner. Finally, the last round Lst within the right winding part 5c is wound. The last round Lst is fed back into the left winding part Sa via a return line 2c that is connected to the lead pin 3.

Such a transformer of the inverter for the LCD has a capacitive impedance due to the barrier ribs 1a and the coil 2a going over the barrier ribs 1a and increases the capacitive impedance by the return wire 2c at the linear region in which the last winding round Lst is fed back. Since the large capacitive impedance deteriorates the efficiency of the transformer, the inverter consumes a great amount of power. In reality, when an output voltage of the secondary side of the conventional transformer is measured after determining a winding ratio of the primary side to the secondary side thereof in accordance with a voltage build-up rate, it has approximately 70% of the output voltage predicted by the winding ratio.

SUMMARY OF THE INVENTION

Accordingly, the present invention is directed to a transformer for a lamp driving circuit of a liquid crystal display and a method of winding a coil of a transformer in an inverter of a liquid crystal display that substantially obviate one or more of the problems due to limitations and disadvantages of the related art.

An object of the present invention is to provide a method of winding a coil that is adaptive for reducing a power loss and a transformer having a coil wound using the same.

Another object of the present invention is to provide an inverter for a liquid crystal display that is capable of reducing a power loss.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve these and other advantages and in accordance with the purpose of the present invention, as embodied and broadly described, a method of winding a coil of a transformer in an inverter of a liquid crystal display includes forming a coil winding part with no protrusion member at the bobbin so as to exclude an interference caused by the protrusion member from a path wound with the coil; and continuously winding the coil from one side of the coil winding part to another side thereof.

In another aspect, a method of winding a coil of a transformer in an inverter of a liquid crystal display includes forming a coil winding part with no protrusion member at the bobbin so as to exclude an interference caused by the protrusion member from a path wound with the coil; winding the coil for each block by a desired winding frequency to provide at least two coil blocks; and continuously arranging the coil blocks from one side of the coil winding part to another side thereof.

In yet another aspect, a transformer for driving a lamp of a liquid crystal display includes a bobbin provided with a coil winding part with no protrusion member so as to exclude an interference caused by the protrusion member from a path wound with the coil; and said coil continuously wound from one side of the coil winding part to another side thereof.

In yet another aspect, a transformer for driving a lamp of a liquid crystal display includes a bobbin provided with a coil winding part with no protrusion member so as to exclude an interference caused by the protrusion member from a path wound with the coil; and at least two coil blocks wound with the coil for each block by a desired winding frequency and continuously arranged from one side of the coil winding part to another side thereof.

In yet another aspect, an inverter of a liquid crystal display includes push-pull switching devices provided at the DC/AC converter to alternately intermit the DC voltage; and a transformer having a primary side connected to said switching devices and a secondary side connected to said lamp and including a bobbin continuously arranged with coil blocks wound with a coil by a desired winding frequency from one side of a coil winding part with no protrusion member to another side thereof to build up a voltage applied from said switching devices, thereby driving said lamp.

In yet another aspect, an inverter of a liquid crystal display includes push-pull switching devices provided at the DC/AC converter to alternately intermit the DC voltage; and a transformer having a primary side connected to said switching devices and a secondary side connected to said lamp and including a bobbin continuously arranged with coil blocks wound with a coil by a desired winding frequency from one side of a coil winding part with no protrusion member to another side thereof to build up a voltage applied from said switching devices, thereby driving said lamp.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 5:
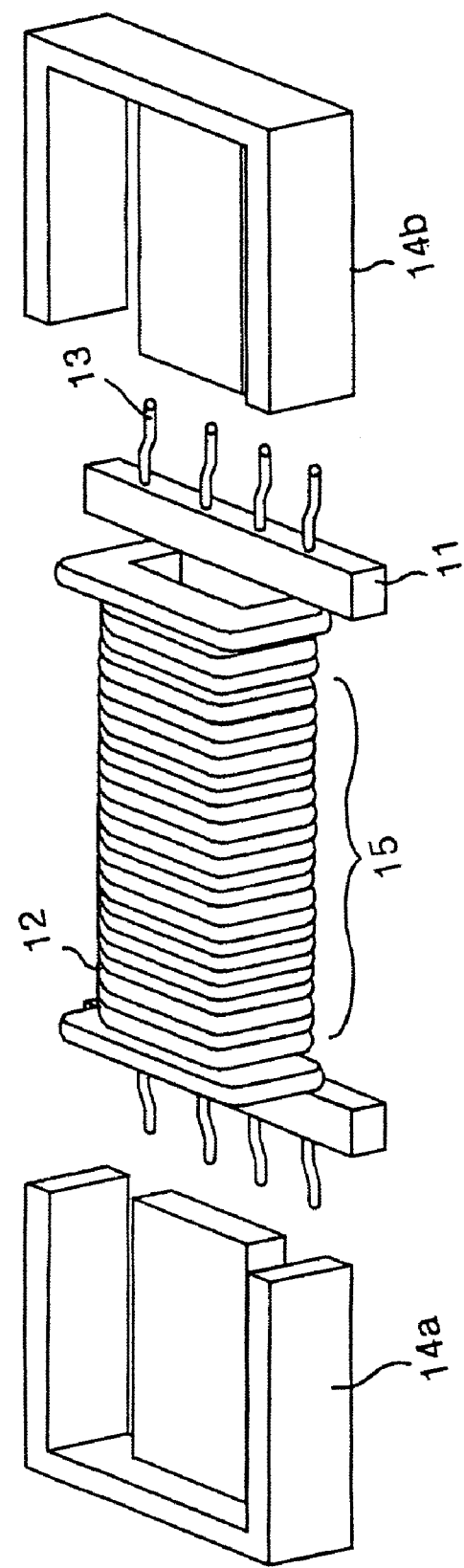
FIG. 5 is an exploded perspective view showing a structure of a transformer for a lamp driving circuit of a liquid crystal display according to a first embodiment of the present invention.
Figure 6:
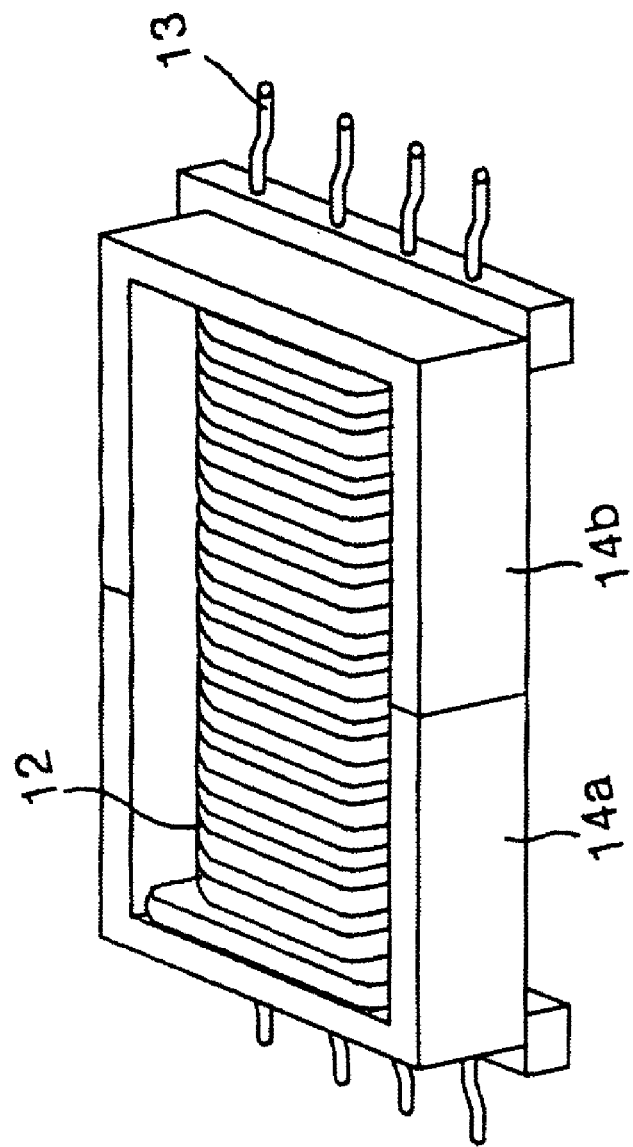
FIG. 6 is a perspective view of the transformer shown in FIG. 5.

Referring to FIG. 5 and FIG. 6, there is shown a transformer for a lamp driving circuit of a liquid crystal display (LCD) according to an embodiment of the present invention.

The transformer includes a bobbin 11 wound with a coil 12 within a single winding part 15 that is not provided with a barrier rib or a protrusion member, and ferrite cores 14a and 14b introduced into the bobbin 11.

The bobbin 11 is molded with a plastic. The ferrite cores 14a and 14b are mixed with a fine powder, such as iron oxide or manganese, for example, that is responsible for guiding a magnetic flux. Each of these ferrite cores 14a and 14b is molded into an 'E' shape, and the centers thereof pass through the bobbin 11. The side walls of the ferrite cores 14a and 14b surround the side wall of the bobbin 11 wound with the coil 12. The coil 12 has a primary side and a secondary side wound at different winding frequencies in accordance with predetermined winding ratios, and a current flows in the coil 12.

Each end of the bobbin 11 is provided with a lead pin 13. A winding ratio of the coil 12 is determined differently at the primary side from the secondary side in accordance with a desired voltage build-up rate. The single winding part 15 is arranged between the side walls positioned at each end of the bobbin 11 and is not provided with any barrier rib or protrusion member to be gone over by the coil 12.

Figure 1:
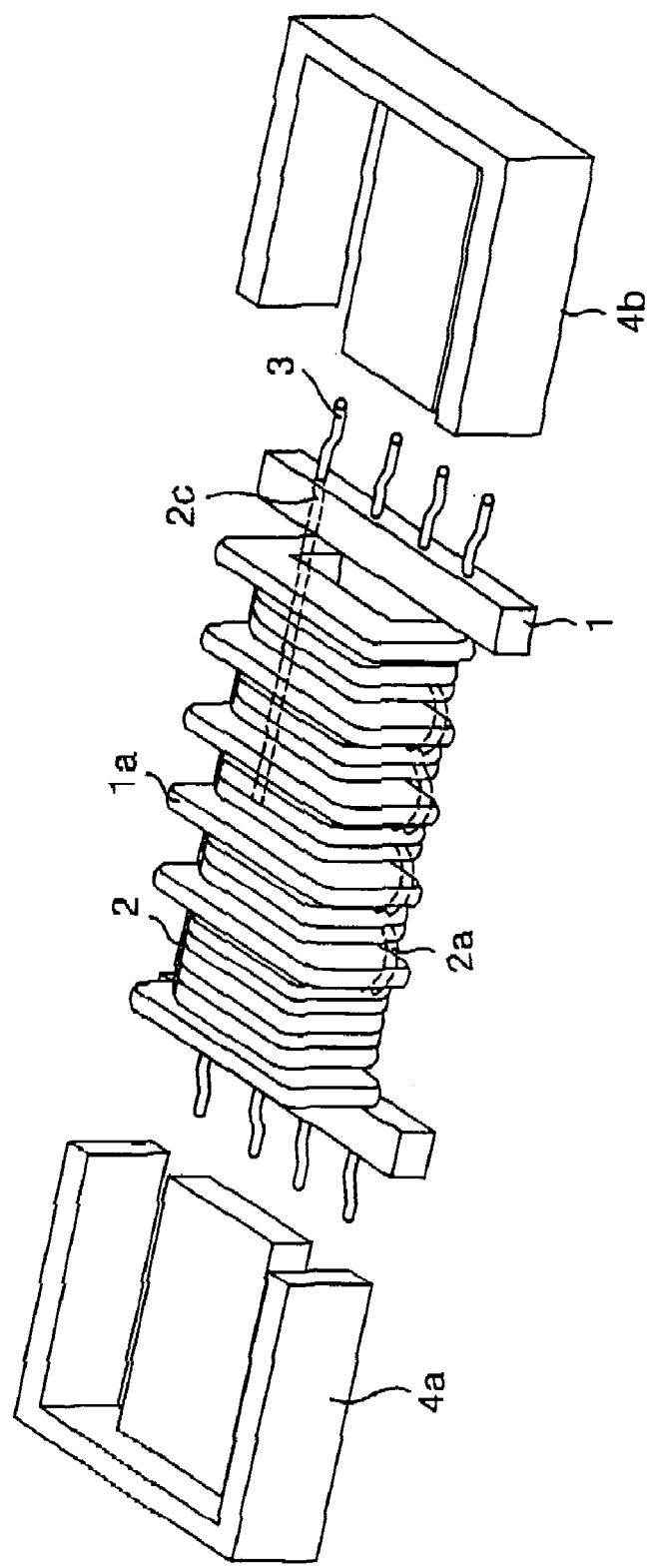
FIG. 1 is an exploded perspective view showing a structure of a transformer for a lamp driving circuit of a conventional liquid crystal display.
Figure 2:
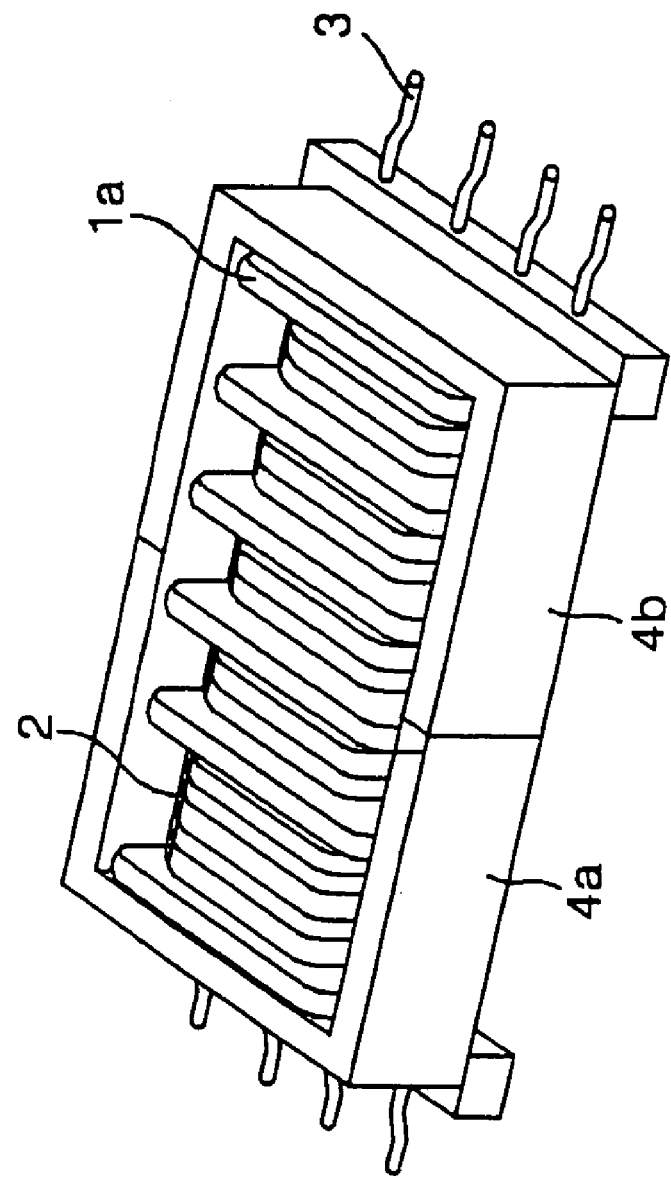
FIG. 2 is a perspective view of the transformer shown in FIG. 1.
Figure 3:
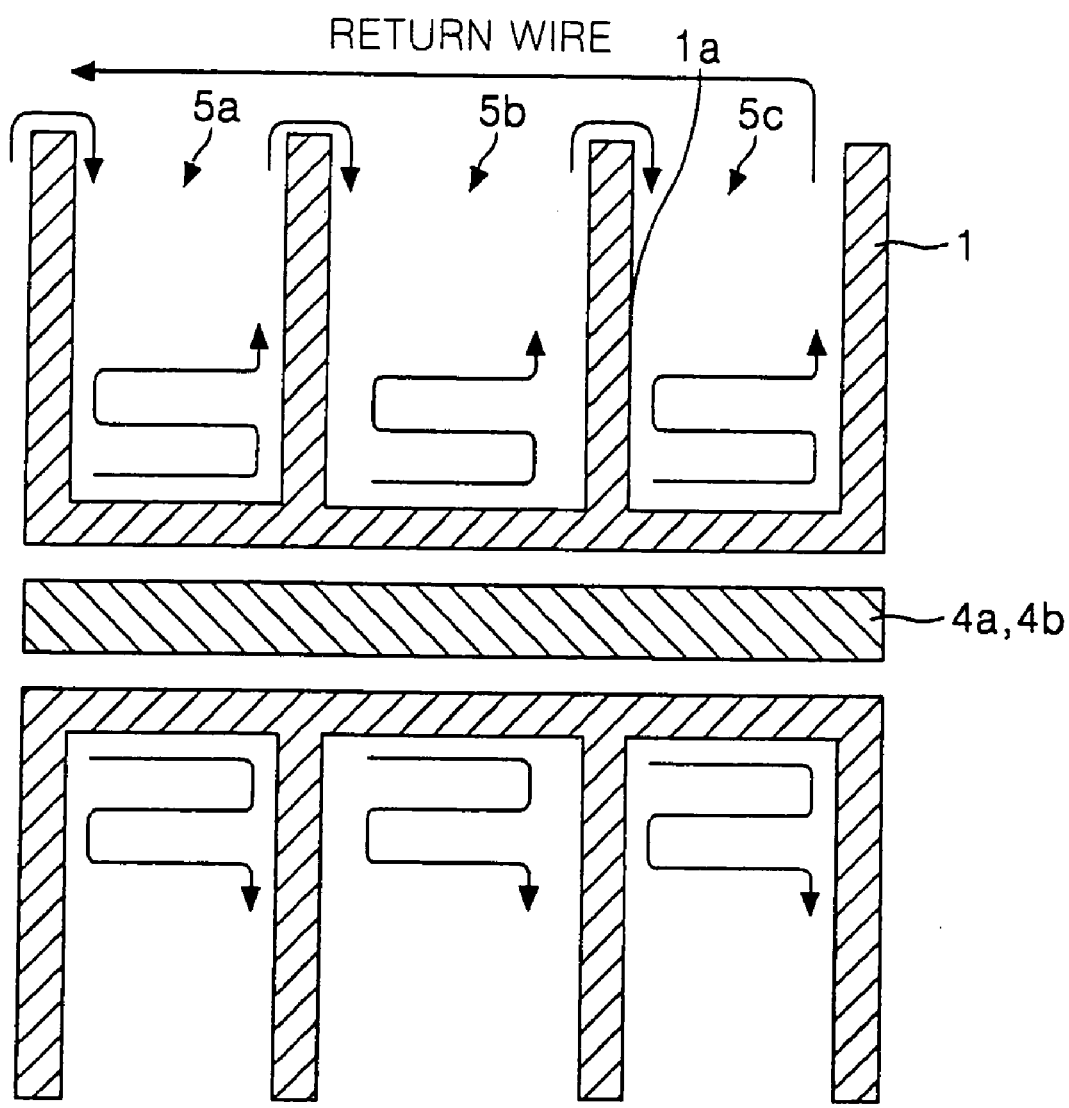
FIG. 3 is a section view showing a winding arrangement of the transformer shown in FIG. 1.
Figure 4:
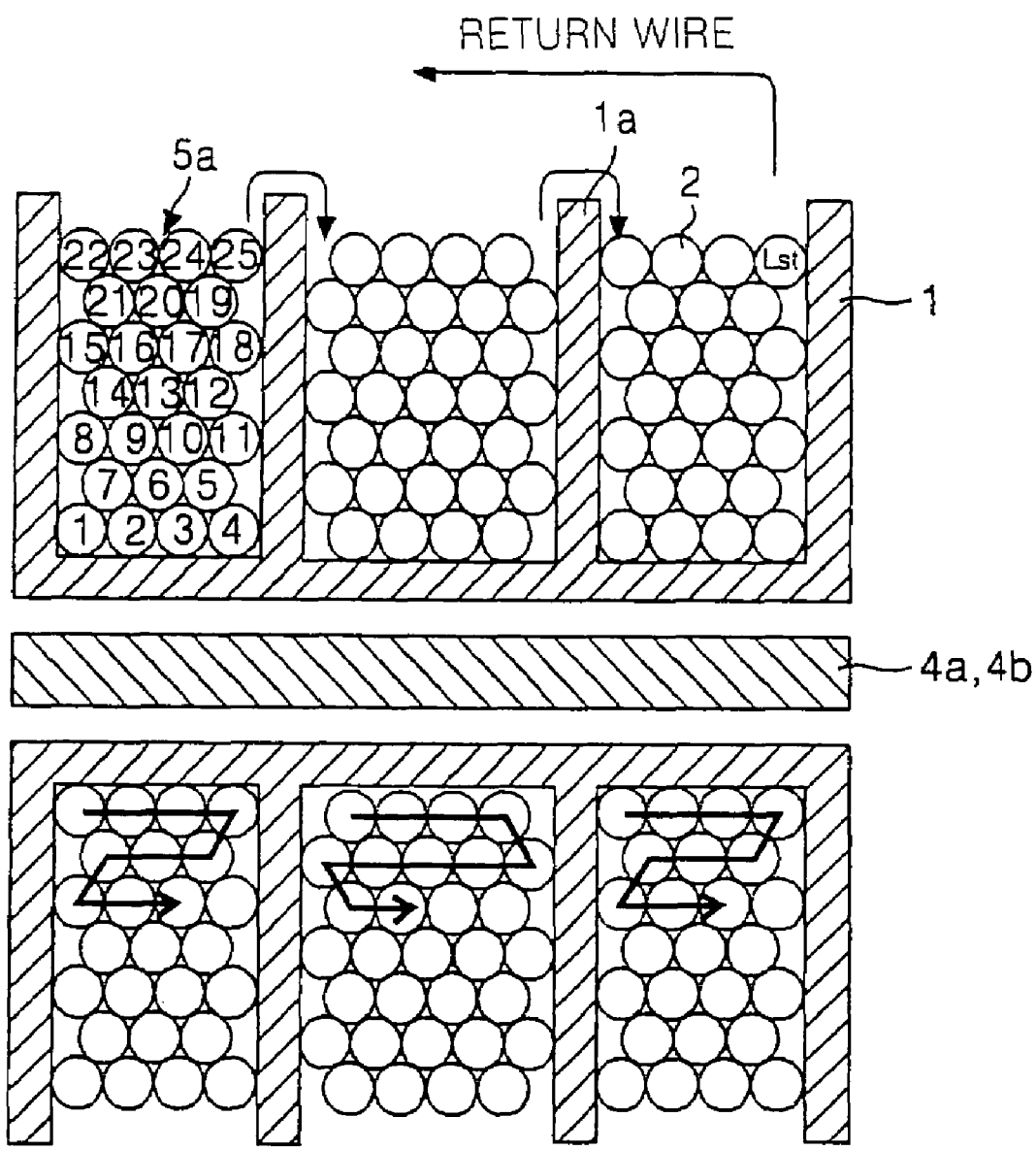
FIG. 4 is a section view showing a winding arrangement of the transformer shown in FIG. 1 in detail.
Figure 7:
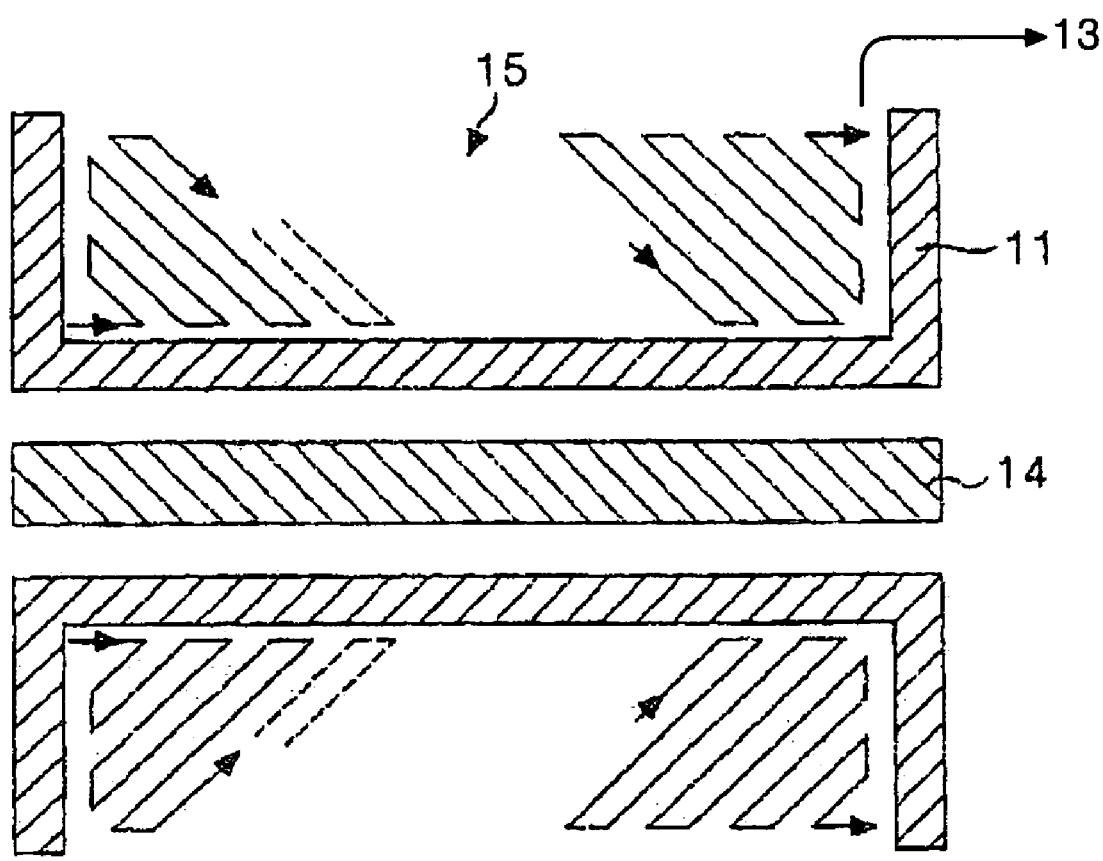
FIG. 7 is a section view showing a winding arrangement in the transformer shown in FIG. 5.
Figure 8:
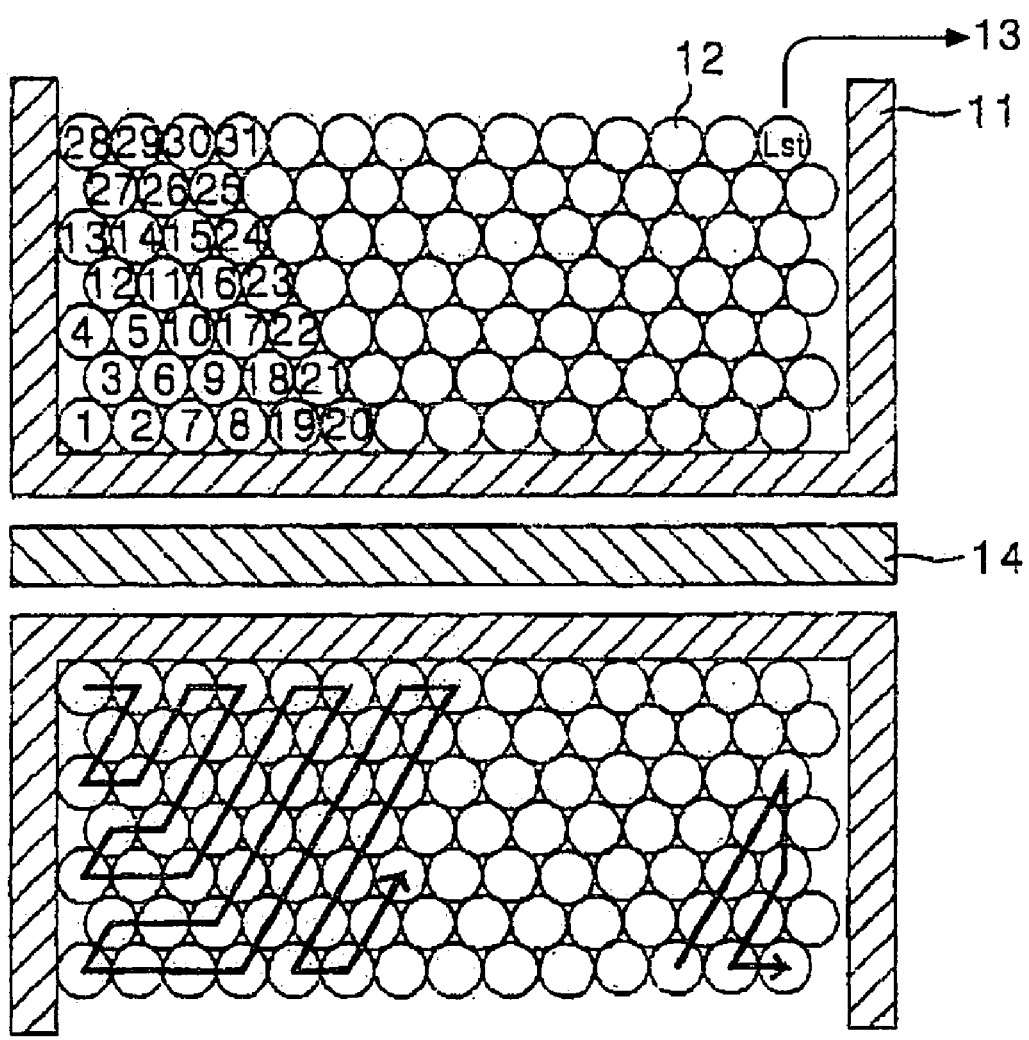
FIG. 8 is a section view for showing a winding arrangement in the transformer shown in FIG. 5 in detail.

A winding arrangement in the transformer according to an embodiment of the present invention is as shown in FIG. 7 and FIG. 8. In FIG. 7 and FIG. 8, a winding begins with the first round at the bottom being adjacent to the left side wall of the bobbin 11 and progresses toward the right side in a zigzag shape in an oblique line direction. Finally, the last round Lst at the upper portion of the right side wall of the bobbin 11 is wound. The coil 12 wound in this manner is connected to two lead pins 13 at the primary side and the secondary side. The transformer wound with the coil 12 as mentioned above is installed at the DC/AC converter included in the inverter circuit of the LCD shown in FIG. 1 to generate a high voltage required for a cold cathode fluorescent lamp (CCFL).

In the transformer according to the present invention, a winding is continuously made from the first round until the last round Lst without interference from any barrier rib or protrusion member within the winding space in the winding coil 12 and a return wire resulting in the linear region does not exist, so that a capacitive impedance can be minimized. An output voltage of the secondary side of the transformer according to the present invention has more than about 75% of the output voltage of the secondary side forecasted in accordance with a winding ratio.

Figure 9:
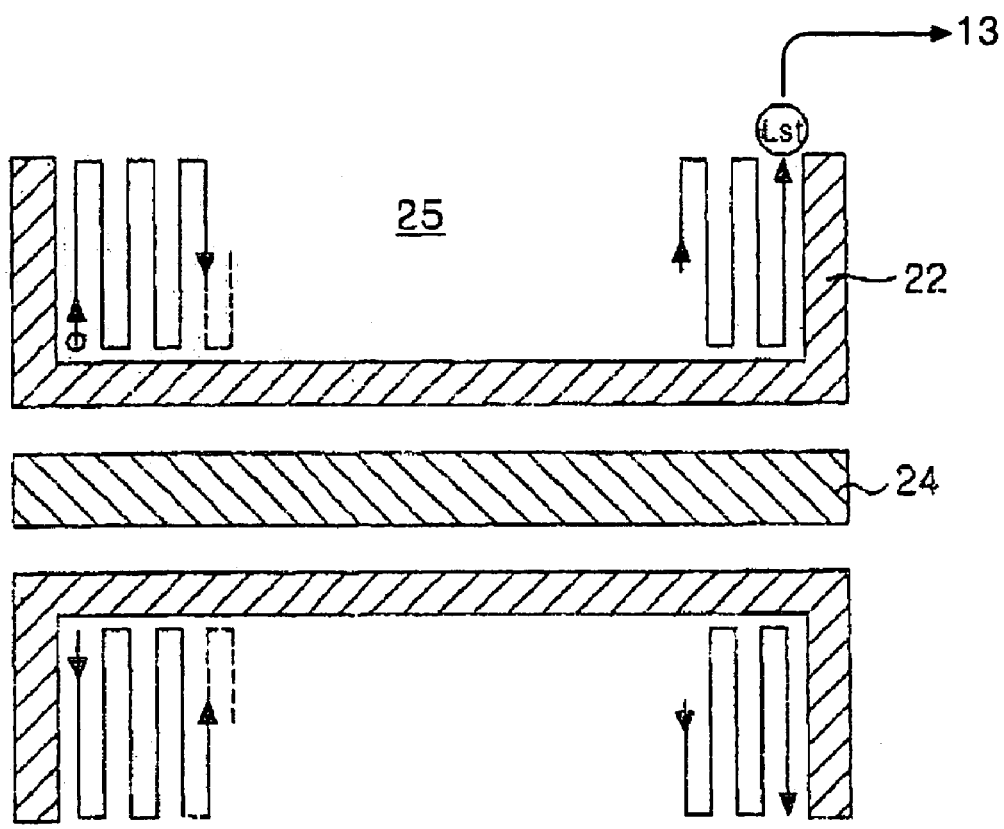
FIG. 9 is a section view for showing a winding arrangement in a transformer of a lamp driving circuit of a liquid crystal display according to a second embodiment of the present invention.

FIG. 9 shows an arrangement of winding a transformer for a lamp driving circuit of an LCD according to a second embodiment of the present invention.

Referring to FIG. 9, the transformer according to the second embodiment has a coil wound in the vertical and horizontal directions within a single winding part 25 that is not provided with a barrier rib or a protrusion member.

A ferrite core 24 is introduced into the bobbin 22. Each end of the bobbin 22 is provided with lead pins to which the input and the output of the coil are connected. A winding ratio of the coil is determined differently at the primary side and the secondary side in accordance with a desired voltage build-up rate. The single winding part 25 is arranged between the side walls positioned at each end of the bobbin 22 and is not provided with any barrier rib to be gone over by the coil.

In the method of winding the present transformer, a winding begins with the first round at the bottom of the left side wall of the bobbin 22 and is formed upwardly in the vertical direction until the upper surface of the bobbin 22, increasing the number of windings, and thereafter is formed once more in the horizontal direction. Subsequently, a coil winding is formed downwardly in the vertical direction and is formed once more in the horizontal direction at the bottom, and is again formed upwardly in the vertical direction. In his manner, the coil is wound from the first round until the last round Lst. The coil wound as mentioned above is connected to two lead pins at the primary side and the secondary side. It is preferred that an adhesive be coated onto the surface of the coil so as to prevent the coil wound at the upper portion from collapsing in the winding process because the coil is wound vertically.

Figure 10:
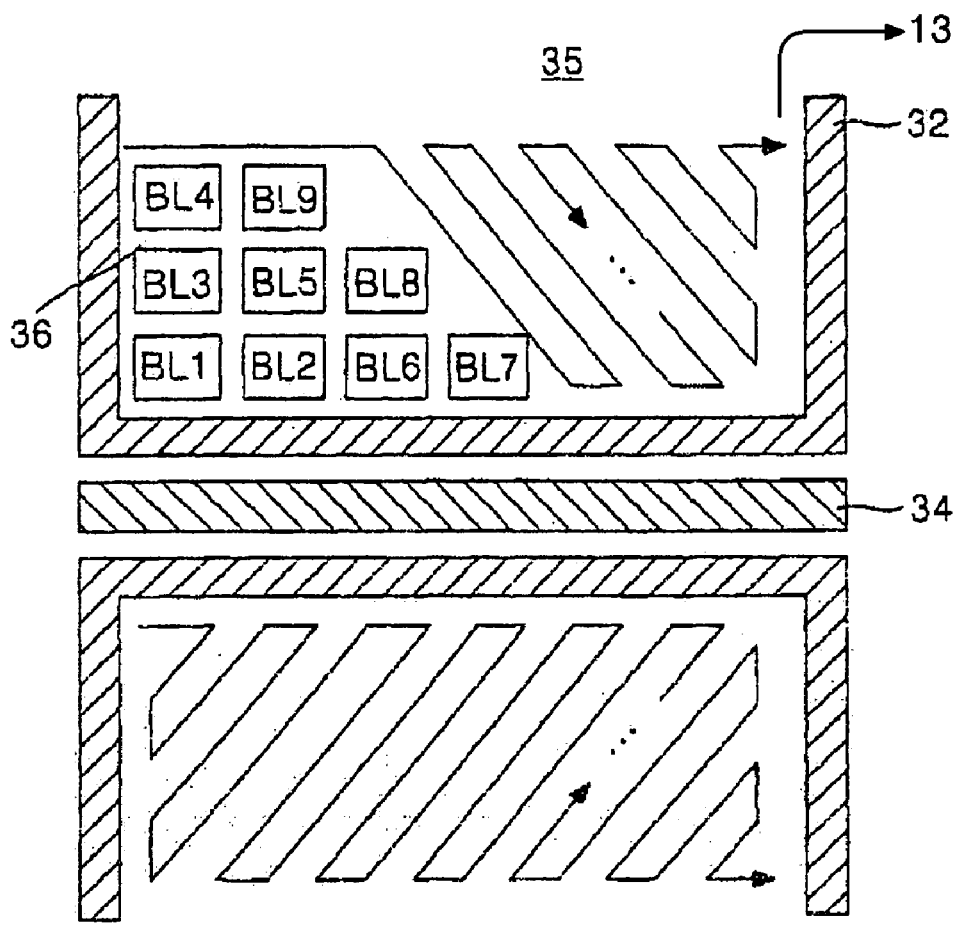
FIG. 10 is a section view for showing a winding arrangement in a transformer of a lamp driving circuit of a liquid crystal display according to a third embodiment of the present invention.

FIG. 10 shows an arrangement for winding a transformer for a lamp driving circuit of an LCD according to a third embodiment of the present invention.

Referring to FIG. 10, the transformer according to the third embodiment has a coil wound per desired block unit within a single winding part 35 that is not provided with a barrier rib or protrusion member.

A ferrite core 34 is introduced into the bobbin 32. Each end of the bobbin 32 is provided with lead pins to which the input and the output of the coil are connected. A winding ratio of the coil is determined differently at the primary side and the secondary side in accordance with a desired voltage build-up rate. The single winding part 35 is arranged between the side walls positioned at each end of the bobbin 32 and is not provided with any barrier rib to be gone over by the coil.

Figure 11:
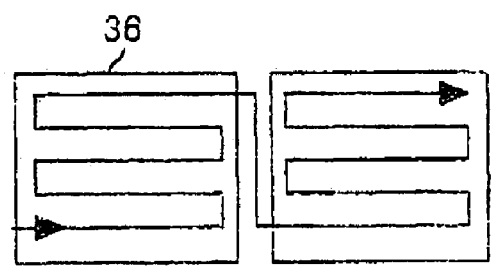
FIG. 11 is a section view for showing an arrangement of winding each of the coil blocks shown in FIG. 10.

In the method of winding the present transformer, the coil is wound for each block. First, a coil winding begins with the first block BL1 positioned at the bottom of the left side wall of the bobbin 32 and is made such that the blocks are successive in a zigzag shape in the oblique direction. In winding a coil within each of the blocks 36, as shown in FIG. 11, a winding begins with the first round coil at the left bottom of the block and goes over the next block at the right upper portion of the block, increasing the number of windings in a zigzag shape in the vertical direction. An adhesive may be coated onto the surface of the coil in order to prevent the coil from collapsing in the coil winding process.

Figure 12:
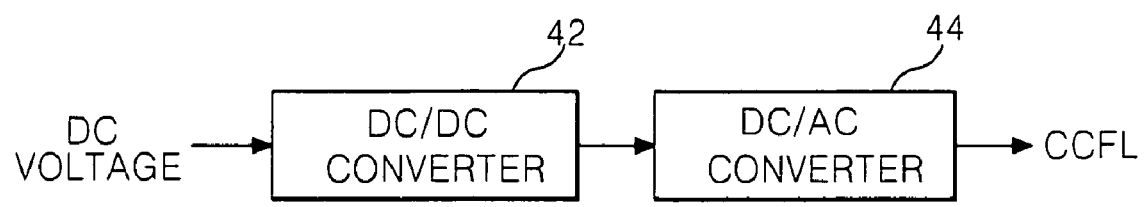
FIG. 12 is a schematic block diagram showing a configuration of an inverter for a liquid crystal display according to an embodiment of the present invention.

The transformer wound with the coil by the same method as the above-mentioned embodiments is installed at an inverter as shown in FIG. 12 to thereby improve power efficiency.

Referring to FIG. 12, an inverter for driving the backlight of the LCD according to the present invention includes a DC/DC converter 42 for generating a DC voltage suitable for driving the backlight using a pulse width modulation (PWM), and a DC/AC converter 44 for converting a DC voltage from the DC/DC converter 42 into a AC voltage to apply it to a cold cathode fluorescent lamp CCFL.

The DC/DC converter 42 outputs a pulse width modulation (PWM) of the DC voltage applied from the power supply to indicate a turn-on interval and a turn-off interval of the lamp. The DC/AC converter 44 functions to convert a voltage applied from the DC/DC converter 42 into an AC voltage sufficiently high to turn on the lamp.

Figure 13:
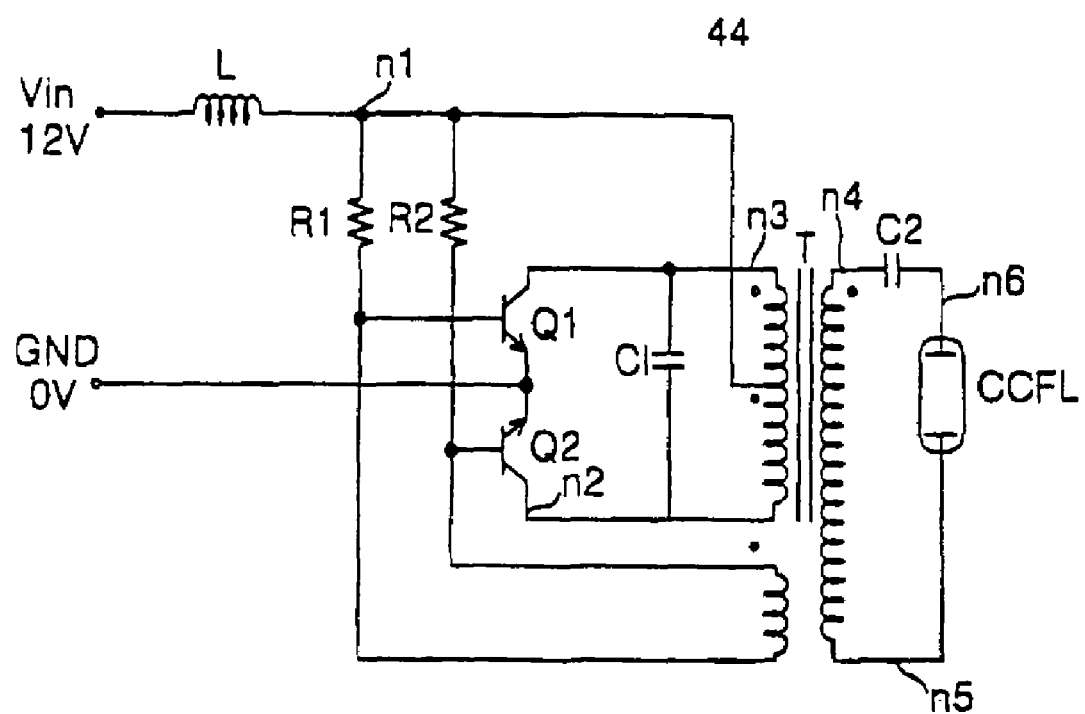
FIG. 13 is a detailed circuit diagram of the DC/AC converter shown in FIG. 12.

Referring to FIG. 13, the DC/AC converter 44 of the present inverter includes an Inductor L to which a half-wave rectified voltage from the DC/DC converter 42 is applied. First and second transistors Q1 and Q2 are connected in a push-pull arrangement and are commonly connected, via resistors R1 and R2, to a first node n1. A first capacitor C1 is connected to the collector terminals of the first and second transistors Q1 and Q2. A cold cathode fluorescent lamp CCFL is connected so as to be turned on by a high AC voltage. A transformer T is provided for building up a voltage across the first capacitor C1. A second capacitor C2 is connected between a secondary side coil of the transformer T and the cold cathode fluorescent lamp CCFL.

Figure 14A:
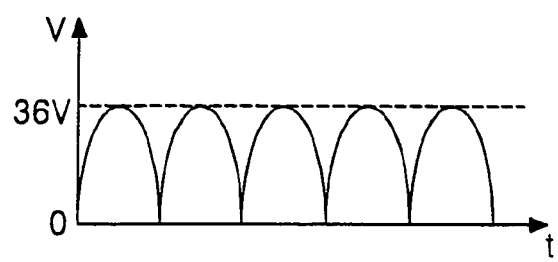
FIG. 14A to FIG. 14D are waveform diagrams of voltage signals detected at each node of the DC/AC converter shown in FIG. 13.
Figure 14B:
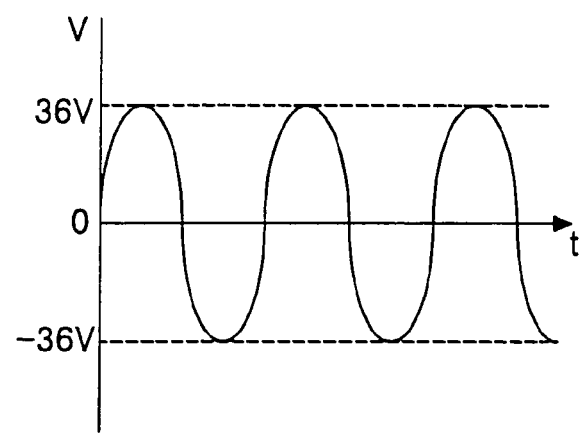
Figure 14C:
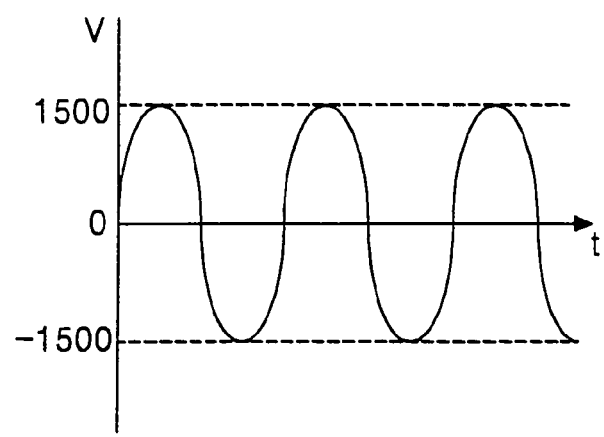
Figure 14D:
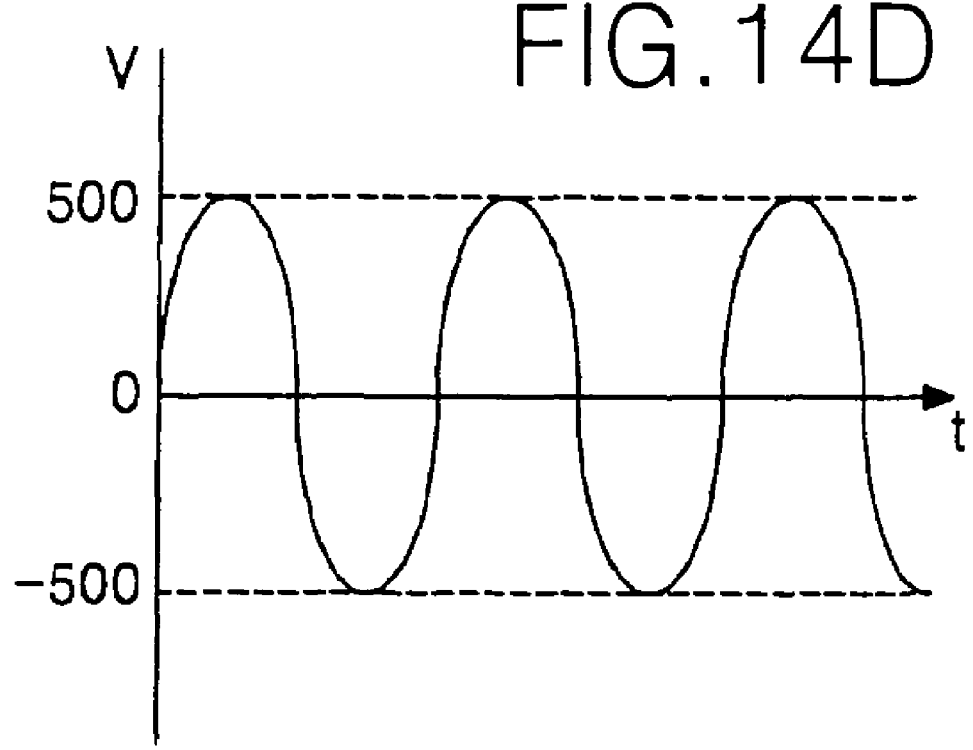

If a half-wave rectified voltage of 12V is fed to an input terminal of the DCIAC converter 44, then it is applied, via the inductor L, the first node n1 and the first resistor R1, to a gate terminal of the first transistor Q1. A voltage at the first node nil becomes a half-wave rectified voltage of 36V as shown in FIG. 14A. T he first and second transistors Q1 and Q2 are alternately turned on by voltages applied to their gate terminals via the resistors R1 and R2, respectively. When the first transistor Q1 is turned on, the inductor L is charged with a current. If the first and second transistors Q1 and Q2 are alternately turned on, then the first resonant capacitor C1 and the primary side coil are resonated to output an oscillating waveform similar to a sinusoidal wave. When the second transistor Q2 is turned on, a current stored in the inductor L is applied to the primary side coil of the transformer T. A voltage measured between the second node n2 and the third node n3 becomes an AC voltage of 36Vp-p as shown in FIG. 14B. As the first and second transistors Q1 and Q2 are alternately turned on, the transformer T builds up a primary side voltage at a build-up rate according to a winding ratio of the primary side coil to the secondary side coil to induce it into the secondary side thereof. The built-up AC voltage has a magnitude of 1500Vp-p, as shown in FIG. 14C, between the fourth node n4 and the fifth node n5, and is applied, via the second capacitor C2, to the cold cathode fluorescent lamp CCFL to radiate the cold cathode fluorescent lamp CCFL. A voltage across the cold cathode fluorescent lamp CCFL, that is, a voltage between the fifth node n5 and the sixth node n6, has a magnitude of 500Vp-p, as shown in FIG. 14D.

The transformer T has a coil continuously wound from the first round until the last round without any coil going up the barrier rib and any returned coil within the coil winding part of the bobbin like the above-mentioned embodiments. The transformer T wound with the coil in this manner reduces a capacitive impedance, thereby lowering the power consumption of the inverter as well as improving efficiency.

As described above, according to the present invention, the coil is continuously wound from the first round until the last round within a single coil winding part with no barrier rib, and the coil return wire at the linear region is eliminated, thereby minimizing a capacitive impedance of the transformer caused by the coil going up the barrier rib and the return wire at the linear region. As a result, it becomes possible to minimize power consumption and to improve efficiency. In addition, in the inverter of the LCD according to the present invention, the transformer continuously wound with coil from the first round until the last round within the single coil winding part with no barrier rib is installed at the DC/AC converter, thereby reducing power consumption as well as improving efficiency.

It will be apparent to those skilled in the art that various modifications and variations can be made in the transformer for a lamp driving circuit of a liquid crystal display and a method of winding a coil of a transformer in an inverter of a liquid crystal display of the present invention without departing from the spirit or scope of the invention. Thus, it is intended that the present invention cover the modifications and variations of this invention provided they come within the scope of the appended claims and their equivalents.

What is claimed is:

1. A transformer for driving a lamp of a liquid crystal display including a bobbin wound with a coil and a core introduced into the bobbin, said transformer comprising:
   the bobbin provided with a coil winding part having no protrusion member so as to exclude an interference caused by the protrusion member from a path wound with the coil and a pair of lead pins each extending from opposing ends of the bobbin along opposing directions parallel to a length of the bobbin; and
   said coil continuously wound starting from one end of the coil winding part and terminating at another end thereof and connected to two lead pins at a primary side and a secondary side without using a return wire, the coil being continuously wound from one side of the coil winding part to another side thereof, such that a number of windings is periodically increased in the vertical direction,
   wherein the core includes first and second E-shaped core portions each having centers passing through a center of the bobbin and sidewall portions surrounding sides of the bobbin.

2. The transformer according to claim 1, wherein the coil is continuously wound from one side of the coil winding part to another side thereof on a zigzag basis in an oblique direction.

3. The transformer according to claim 1, wherein a surface of the coil is coated with an adhesive so as to prevent the coil from collapsing during the winding process.

4. A transformer for driving a lamp of a liquid crystal display, including a bobbin wound with a coil and a core introduced into the bobbin, said transformer comprising:
   the bobbin provided with a coil winding part having no protrusion member so as to exclude an interference caused by the protrusion member from a path wound with the coil and a pair of lead pins each extending from opposing ends of the bobbin along opposing directions parallel to a length of the bobbin; and
   at least two coil blocks wound with the coil for each block by a desired winding frequency and continuously arranged starting from one end of the coil winding part and terminating at another end thereof and connected to two lead pins at a primary side and a secondary side without using a return wire,
   wherein the core includes first and second E-shaped core portions each having centers passing through a center of the bobbin and sidewall portions surrounding sides of the bobbin.

5. The transformer according to claim 4, wherein the coil is continuously wound from a lower portion to an upper portion, such that the coil blocks have a number of windings increased periodically in the horizontal direction.

6. The transformer according to claim 4, wherein the coil blocks are continuously arranged from one side of the coil winding part to another side thereof on a zigzag basis in an oblique direction.

7. The transformer according to claim 4, wherein a surface of the coil is coated with an adhesive so as to prevent the coil from collapsing during the winding process.

* * * * *